(12) United States Patent
Lee

(10) Patent No.: US 6,904,000 B1
(45) Date of Patent: Jun. 7, 2005

(54) OBJECT LOCATOR SYSTEM

(76) Inventor: Fu Ching Lee, P.O. Box 6611, Beverly Hills, CA (US) 90212

( * ) Notice: Subject to any disclaimer, the term of this patent is extended or adjusted under 35 U.S.C. 154(b) by 13 days.

(21) Appl. No.: 10/712,231

(22) Filed: Nov. 14, 2003

(51) Int. Cl.[7] .................................................. H04B 1/59
(52) U.S. Cl. ......................................... 367/128; 367/2
(58) Field of Search ................................ 367/128, 2, 6

(56) References Cited

U.S. PATENT DOCUMENTS

| 5,528,232 A | * | 6/1996 | Verma et al. ................ 367/128 |
| 6,075,442 A | | 6/2000 | Welch |
| 6,246,322 B1 | | 6/2001 | LeDain et al. |
| 6,297,737 B1 | | 10/2001 | Irvin |
| 6,535,108 B1 | | 3/2003 | Schrott et al. |
| 2002/0067660 A1 | * | 6/2002 | Bokhour ...................... 367/128 |

* cited by examiner

*Primary Examiner*—Daniel Pihulic

(57) ABSTRACT

This invention is a system for locating an object. A tag unit (100) that is attached or embedded into the object to be located generates radio frequency signals when excited by an ultrasonic wave (108). The locator unit (100) generates the ultrasonic wave (108) and receives radio frequency signals from the tag unit (110). The locator unit (100) determines the signal strength of the received radio frequency signal and provides a representation of the strength. By monitoring the signal strength indication, the user will be directed to the object.

5 Claims, 2 Drawing Sheets

OBJECT LOCATOR SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to an apparatus for locating an object comprising a Locator unit and a Tag unit, specifically to self-contained Tag units that can be embedded in the object to be located.

BACKGROUND OF THE INVENTION

In everyday life, it is quite common to misplace an object such as a set of keys or a TV remote control or in games such as golf, a golf ball. In the case of keys or TV remote control, the effort required to find them can be considerable and the frustration at its lost un-calculate-able. In the case of the golf ball, the difference between locating the ball and not, could be the difference between winning and losing.

Looking at the large numbers of prior art on this subject, it is apparent that many consider this a serious problem.

A simplification of the prior art on this subject shows systems that consist of two units, a locator unit and a tag unit. The locator unit is the device the user activates in locating the misplace object. The tag unit is the device that is previously attached to the object to be located. The activation of the locator unit sends a signal to the tag unit that causes a response the user can use to locate the tag unit and hence the misplaced object.

U.S. Pat. No. 6,246,322 B1 to LeDain et al (2001) discloses a device that emits an audio signal when handclaps are heard. Here the locator unit is a user's hands, the signal is the audible handclap sound and the tag unit response is to emit an audible sound.

U.S. Pat. No. 6,297,737 B1 to Irvin (2001) discloses a system of radio frequency locator and tag. Here the locator unit is a radio frequency transmitter, the signal is a radio frequency signal and the tag unit response is to emit an audible sound.

U.S. Pat. No. 6,075,442 to Welch (2000) discloses a system of radio frequency locator and tag. Here the locator unit is a radio frequency transmitter and a multi antenna receiver, the signal is a radio frequency signal and the tag unit response is to emit radio frequency signals.

U.S. Pat. No. 6,535,108 B1 to Schrott et al (2003) discloses a passive RFID system. Here the locator unit is a near field electromagnetic transmitter, the signal is a magnetic wave and the tag unit response is to modulate the transmitter magnetic wave (backscatter).

The above prior art and others in this field suffers from the requirement to provide power to the tag unit. Frequently this is in the form of batteries. The necessity to replace or repower the power source limits its use and convenience.

For prior art that does not require power in the tag unit, such as Schrott et al, forces the locator unit to be of such large dimensions as to prevent them from being used as portable devices.

BACKGROUND OF THE INVENTION— OBJECTS AND ADVANTAGES

Accordingly, several objects and advantages of my invention are:

(a) to provide a system in which the tag unit does not require an integrated power source;

(b) to provide a system in which the tag unit is self-contained and of sufficient small size to be embedded in the object, such as in a golf ball; and (c) to provide a system which will provide directional indications to the misplaced object.

Still further objects and advantages will become apparent from consideration of the ensuing description and drawings.

SUMMARY

In accordance with the above-mentioned objects and advantages, the present invention consists of an apparatus for locating an object, the apparatus comprising a tag unit and a locator unit. The tag unit is attached or embedded into the object to be located. The locator unit is user activated and provides indications to the user of the location of the tag unit.

DRAWINGS—FIGURES

DETAILED DESCRIPTION

Figure 1:
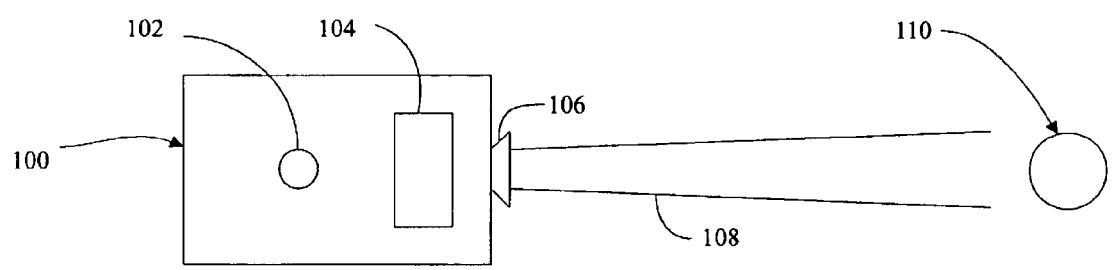
FIG. 1 shows a top view of the locator and tag units.
Figure 2:
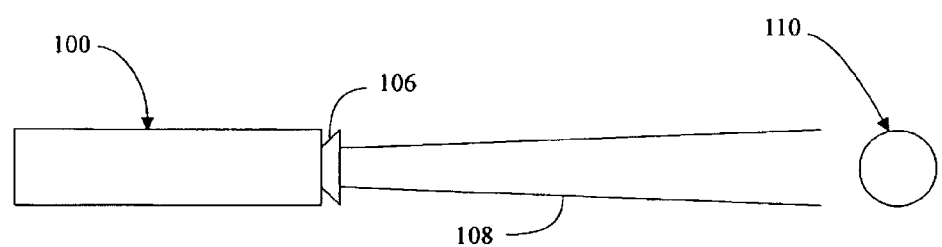
FIG. 2 shows a side view of the locator and tag units.
Figure 3:
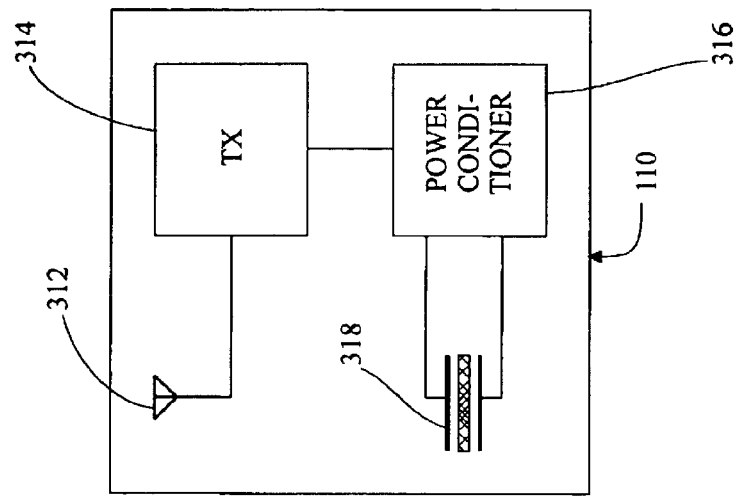
FIG. 3 shows a block diagram of the locator and tag units.
Figure 3:
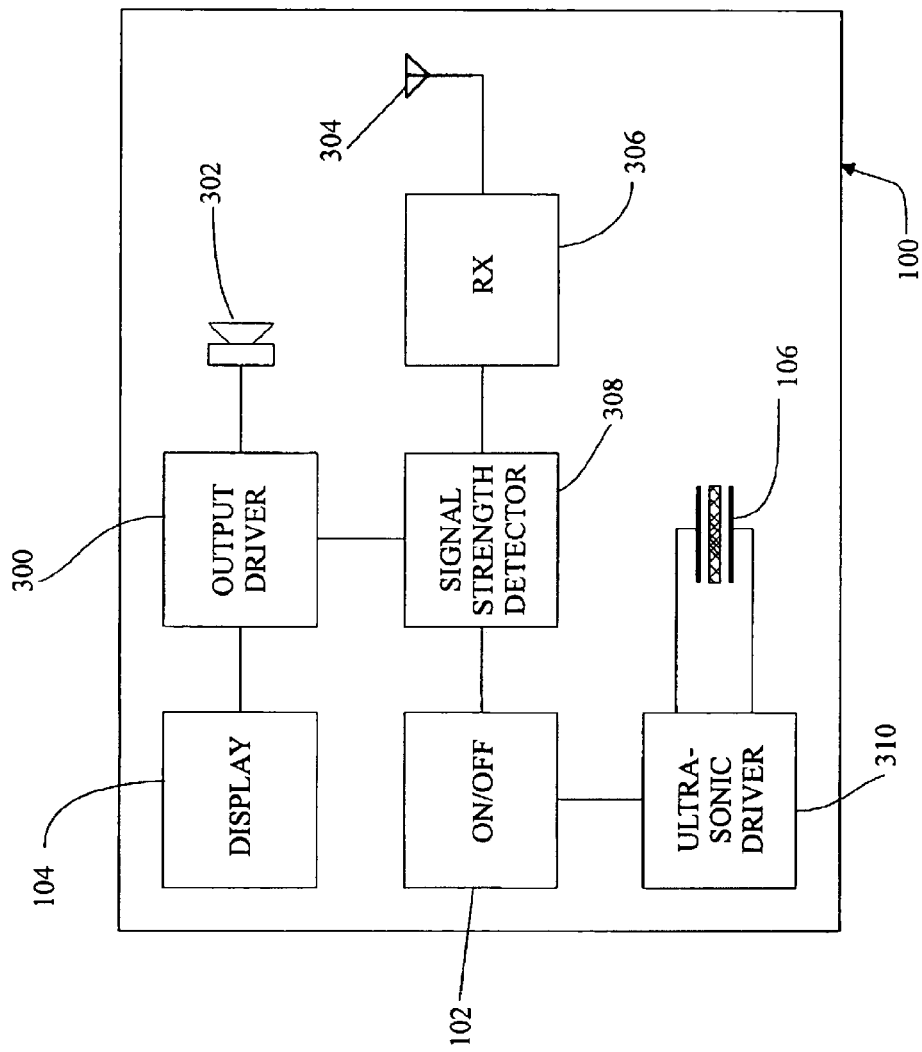

FIGS. 1 and 2 shows the top and side views of the Object Locator System in a typical operating environment and FIG. 3 shows a block diagram representation of the circuitry contained in the Object Locator System. The Object Locator System consists of a Tag Unit 110 that is attached or embedded into an object to be located and a Locator Unit 100 that can be used to direct a user to the Tag Unit 110 and hence the object to be located. The user activates the Locator Unit 100 by means of an On/Off switch 102 that supplies electrical power to the Locator Unit 100. An ultrasonic signal is caused to be generated by means of an ultrasonic driver 310 and coupled to an ultrasonic transducer 106. The ultrasonic transducer 106 converts the ultrasonic signal to an ultrasonic wave 108. Ultrasonic waves have a directional nature and as illustrated in FIGS. 1 and 2 travel in a narrow beam from the ultrasonic transducer. The user moves Locator Unit 100 in a way such that the ultrasonic wave 108 is caused to cover a search area where the object to be located may be placed. As the ultrasonic wave 108 is caused to fall onto the Tag Unit 110, the ultrasonic wave 108 excites an ultrasonic transducer 318 in the Tag Unit 110. The excitation of the ultrasonic transducer 318 induces an alternating voltage in the ultrasonic transducer 318 that is rectified and conditioned by a power conditioner circuit 316. The conditioned voltage is used to power a radio frequency transmitter 314. The amplitude of the alternating voltage induced in the ultrasonic transducer and hence the conditioned voltage is directly proportional to the intensity of the ultrasonic wave 108 that excites it. The radio frequency transmitter 314 generates a first radio frequency signal that is coupled for transmission to an antenna 312. The Locator Unit 100, using an antenna 304 and receiver 306 receives the first radio frequency signal from the Tag Unit 110. The signal strength of the received radio frequency signal is determined by a signal strength detector circuit 308. The signal strength detector circuit 308 activates a display 104 and an audio transducer 302 as a function of the signal strength of the received radio frequency signal. The orientation of the Locator Unit 100 that indicates peak signal strength at a particular position indicates the direction of the Tag Unit 110. Additionally the peak signal strength at a particular location represents a measure of the range of the Locator Unit 100 from the Tag Unit 110.

The radio frequency transmitter 314 can be programmed to generate a unique signal to prevent its output radio frequency signal from being received by another receiver. The radio frequency transmitter 314 and receiver 306 therefore communicates to the exclusion of other transmitters and receivers operating in the vicinity of the transmitter 314—receiver 306 pair. This can be accomplished in many ways. One particular way involves the use of PIN code as in garage door openers where the transmitter outputs a radio frequency signal of predetermined frequency and having a coded digital output that uniquely identifies the transmitter. The coded PIN number is detected and decoded by the receiver 306 and discarded if the PIN code does not match that programmed into the receiver 306. If the PIN code does match, then the signal is passed to the signal strength detector circuit 308. In this way, the Locator Unit 100 can be used with multiple Tag Units 110.

The display 104 can be of any number display types, such as LED bar graph, moving pointer meter, and the like. The audio transducer 302 can be of any number of transducer types, such as Piezo-buzzers, moving coil speakers, and the like. Any combination of display 104 or audio transducer 302 can be configured, as long as it allows the user to differentiate between different levels of signal strength.

EXAMPLE APPLICATION

A golfer hits a golf ball embedded with a Tag Unit 110 and hooks it into high rough. On arriving at a spot where the golfer presumes the golf ball is; a detail search cannot find the ball.

The golfer activates the Locator Unit 100 and monitors the display 104 and or audio transducer 302. The golfer will move the Locator Unit 100 in a manner to cause the ultrasonic wave 108 to sweep back and forth about and around the golfer until an indication is encountered on the display 104 and or audio transducer 302. Making note of the direction where peak signal strength is indicated, the golfer will move towards this direction with the Locator Unit 100 keeping the ultrasonic wave 108 in the same direction. The golfer will progress in said manner until the ball is located. Conclusion, Ramifications and Scope of Invention.

Thus, the reader will see that the object locator apparatus of the invention provides a portable yet economical system for locating objects. Furthermore, the apparatus has the additional advantages in that it provides a directional indication of the location of the object;

it is self contained and can be embedded into objects; and it's tag unit does not require battery power.

While my above description contains much specificity, these should not be construed as limitations on the scope of the invention, but rather as an exemplification of one preferred embodiment thereof. Many other variations are possible such as a second preferred embodiment whereby the Locator Unit 100 includes a plurality of ultrasonic transducers 106 arrange to form a curtain of ultrasonic waves 108. By locating this embodiment of the Locator Unit 100 across an area of interest, the apparatus can inform the user if a Tag Unit 110 has entered the area of interest.

Accordingly, the scope of the invention should be determined not by the embodiment illustrated, but by the appended claims and their legal equivalent.

What is claimed is:

1. An apparatus for locating an object, said apparatus comprising of:

a locating unit comprising an ultrasonic transducer means for transmitting ultrasonic waves in a direction beam manner, a radio frequency receiver means to receive a radio frequency of a predetermined characteristics, a signal strength detector means for identifying a strength of said radio frequency signals of predetermined characteristics and a means for activating a display device as a function of said identified strength of said radio frequency signals of predetermined characteristics received from said radio frequency receiver means;

one or more tag units attachable to objects to be located, each tag unit comprising:

an ultrasonic transducer means for converting said transmitted ultrasonic waves to alternating voltage, a power conditioner means to condition the said alternating voltages to a voltage suitable to provide electrical power to a low power radio frequency transmitter, and a radio frequency transmitter means to transmit a radio frequency signal of predetermined characteristics.

2. The apparatus of claim 1, wherein the ultrasonic transducer means comprises of piezoelectric material transducers.

3. The apparatus of claim 1, wherein the ultrasonic transducer means comprises of a plurality of piezoelectric material transducers.

4. The apparatus of claim 1, wherein the display device comprises of a plurality of light emitting diodes arrange in a row to indicate signal strength.

5. The apparatus of claim 1, wherein the display device comprises of an audio transducer emitting audio frequency waves of differing intensity to indicate signal strength.

* * * * *